United States Patent [19]

Arora

[11] Patent Number: 5,039,732

[45] Date of Patent: Aug. 13, 1991

[54] WATER-DISPERSABLE AIR-DRYING COATINGS

[75] Inventor: Kartar S. Arora, Darien, Ill.

[73] Assignee: The Sherwin-Williams Company, Cleveland, Ohio

[21] Appl. No.: 292,597

[22] Filed: Dec. 30, 1988

[51] Int. Cl.$^5$ .............................................. C08L 75/04
[52] U.S. Cl. ................................... 524/591; 524/840; 528/71; 528/85
[58] Field of Search .................. 524/591, 840; 528/71, 528/85

[56] References Cited

U.S. PATENT DOCUMENTS

| | | | |
|---|---|---|---|
| 3,248,397 | 4/1966 | Purcell | 260/307 |
| 3,412,054 | 11/1968 | Milligan et al. | 260/18 |
| 3,479,310 | 11/1969 | Dieterich et al. | 260/29.2 |
| 3,870,684 | 3/1975 | Witt et al. | 260/75 |
| 3,922,253 | 11/1975 | Jerabek et al. | 260/77.5 |
| 4,066,591 | 1/1978 | Scriven et al. | 260/29.2 |
| 4,092,286 | 5/1978 | Noll et al. | 260/29.2 |
| 4,116,902 | 9/1978 | Harris et al. | 260/22 |
| 4,132,686 | 1/1979 | Toyoshima et al. | 260/21 |
| 4,147,674 | 4/1979 | Vasta | 260/17 |
| 4,147,679 | 4/1979 | Scriven et al. | 260/29.2 |
| 4,254,168 | 3/1981 | Monson | 427/409 |
| 4,268,426 | 5/1981 | Williams et al. | 260/22 |
| 4,277,380 | 7/1981 | Williams et al. | 260/18 |
| 4,375,498 | 3/1983 | Le Minez et al. | 428/416 |
| 4,382,114 | 5/1983 | Hohlein et al. | 428/423.1 |
| 4,489,135 | 12/1984 | Drexler et al. | 428/423.1 |
| 4,719,132 | 1/1988 | Porter, Jr. | 427/409 |

FOREIGN PATENT DOCUMENTS 0220000 4/1987 European Pat. Off. .

OTHER PUBLICATIONS

Angus Chemical Company Technical Data Sheet, TDS 10, *Aminohydroxy Compounds*, pp. 1–8.

Copyright 1986, International Minerals & Chemical Corporation, *A Complete Guide To DMPA ® Brand of Dimethylolpropionic Acid*, pp. 1–54.

International Minerals & Chemical Corporation, ICD Product Guides, IC Series, TDS No. 34, *DMPA ® Dimethylolpropionic Acid*.

Wilma J. Schneider and Lyle E. Gast, *Water–Dispersible Urethane Polyesteramide Coatings From Linseed Oil*, (Journal of Coatings Technology, vol. 50, No. 646, Nov. 1978), pp. 76–81.

Primary Examiner—Maurice J. Welsh
Attorney, Agent, or Firm—Robert E. McDonald; Steven W. Tan

[57] ABSTRACT

Air-drying, water-reducible, acid-functional polyurethanes are obtained by reacting:
  (i) a fatty amide diol obtained by the reaction of a fatty acid or fatty acid derivative and an N,N-dialkanol amine; and
  (ii) a diisocyanate; and
  (iii) an acid-functional compound which also has two active hydrogen groups, other than acid groups, which are reactive with the dissocyanate.

20 Claims, No Drawings

WATER-DISPERSABLE AIR-DRYING COATINGS

BACKGROUND OF THE INVENTION

1. Field of the Invention

This invention relates to air-drying polyurethane polymers obtained from drying oil or semi-drying oil fatty amides. The polymers are acid-functional and are especially useful as water-dispersable air-drying coatings.

2. Description of the Prior Art

Water-reducible polymers containing unsaturated fatty acids as binders for air-drying coatings are known in the prior art. Alkyd resins prepared by the reaction of unsaturated fatty acids and polyols are one example of polymers containing unsaturated fatty acids which are widely used as binders in surface coatings because of their good application and performance characteristics. Alkyd resins are, however, known to suffer from certain disadvantages when used in water-reducible coatings. In particular, the ester groups in the alkyd resins can be hydrolyzed or transesterified upon storage in aqueous medium. This hydrolysis or transesterification can lead to polymer chain degradation, and can also result in the cleavage of the unsaturated fatty acid groups. The unsaturated fatty acid groups act as the crosslinking sites in the polymer and are responsible for the development of coating properties, such as chemical resistance, flexibility, hardness and durability. Therefore, the performance properties of coatings obtained from water-reducible alkyds can deteriorate on storage of the aqueous dispersions of these resins.

Polyurethanes as a class of binders for surface coatings are known to have good chemical resistance, adhesion and durability. The properties are due, at least in part, to the stability of the urethane groups in a variety of environments. Thus, water-reducible unsaturated fatty acid substituted polyurethanes have been utilized as film-forming polymers in order to minimize some of the disadvantages of water-reducible alkyds.

U.S. Pat. No. 3,412,054, issued Nov. 19, 1968 to Milligan and Hoy, discloses water-reducible polyurethanes for use in surface coatings. The unsaturated fatty acids substituted polyurethanes disclosed are obtained by reactions of unsaturated fatty acid ester polyols or unsaturated fatty acids and diisocyanates. Air-drying water-reducible polyurethane modified alkyds are disclosed in U.S. Pat. No. 4,116,902 issued Sept. 26, 1978 to Harris and Pollack. The unsaturated fatty acids described in that patent are part of an alkyd chain which is further reacted with diisocyanates. U.S. Pat. No. 4,147,679, issued Apr. 3, 1979, to Shriven and Chan, also discloses water-reducible urethane coating compositions containing unsaturated fatty acids. Unsaturated fatty acid substituted polyester-polyols are used in the preparation of these polyurethane coatings materials. Water-reducible unsaturated fatty acids substituted polyurethanes are also disclosed in U.S. Pat. Nos. 4,268,426 and 4,277,380, issued May 19, 1981 and July 7, 1981, respectively to Williams and Rogemoser. The unsaturated fatty acids are incorporated in these polyurethanes by the use of the ester-polyols, in particular, unsaturated fatty acid esters of pentaerythritol.

Schneider and Gast (Journal of Coating Technology, 1978, 50 (646), 76) have reported the preparation of water-dispersable polyurethanes from adducts of linseed oil and N,N-diethanolamide. However, the reaction of linseed oil and N,N-diethanolamide gave mixtures of monoglyceride and amide of linseed fatty acids.

Although the polyurethane materials of the prior art provide some improvement in hydrolytic stability over the fatty acid alkyds, the poor hydrolytic stability of alkyds due to cleavage of fatty acid moieties has not been completely overcome.

This invention involves the discovery that water-reducible unsaturated fatty acid substituted polyurethanes can be prepared by the reactions of amide-polyols of unsaturated fatty acids, diisocyanates, and acid-functional compounds which also contain two active hydrogen groups, other than acid groups, which are reactive with the diisocyanate. Since the unsaturated fatty acid moieties of the present invention are attached to the polymer backbone via amide groups, these water-reducible polyurethanes display improved hydrolytic stability when compared to the water-reducible polyurethanes and water-reducible alkyds of the prior art. Aqueous solutions of polyurethanes prepared according to this invention have shown excellent stability after storage at 120° F. for four weeks or more.

SUMMARY OF THE INVENTION

This invention involves acid-functional air-drying polyurethane polymers. These polymers can be neutralized with a base to provide water-reducible compositions which exhibit excellent hydrolytic stability. By "water-reducible" is meant that the composition can be solubilized or dispersed in water. By "air-drying" is meant that the composition will cure or crosslink upon exposure to air. The air-drying polyurethanes of this invention comprise the reaction product obtained by reacting:

(i) a fatty amide diol obtained by the reaction of a fatty acid or fatty acid derivative and a dialkanol amine; and (ii) a diisocyanate; and (iii) an acid-functional compound which also has two active hydrogen groups, other than acid groups, which are reactive with the diisocyanate.

Optionally, additional materials such as chain extenders and/or small amounts of polyfunctional (i.e., more than 2 active hydrogen or isocyanate containing groups per molecule) materials can also be included in the reaction mixture along with the fatty amide diol, the diisocyanate and the acid-functional compound to produce the reaction product. The reaction product, even if it incorporates the optional chain extenders and/or polyfunctional materials, will be ungelled. By "ungelled" is meant that the reaction product has a fluid nature and can be dissolved in a suitable solvent. Once the reaction product is allowed to cure, e.g. by air oxidation or optional crosslinking, the molecular weight of the reaction product would increase to an extent at which it is no longer fluid and cannot be redissolved in any suitable solvent.

The air-drying polyurethane preferably is prepared to provide an acid value of at least 25 and preferably an acid value of at least 40 so that upon neutralization with a base, the air-drying polyurethane can be utilized as a water-reducible composition. Typically, useful acid values range from 25 to about 150 and most preferably range from 40 to about 100. The amount of neutralization required is only that amount necessary to provide the desired degree of water dispersibility. Useful bases include amines such as ammonia, diethanol amine, triethyl amine, etc. and hydroxides such as potassium hydroxide, sodium hydroxide, etc. Water and, if desired, suitable co-solvents such as esters, alcohols, etc. can be utilized as solvents for the neutralized polyurethane polymer.

This invention also relates to the use of clearcoat/basecoat compositions which utilize the air-drying polyurethane as the clearcoat or basecoat composition.

It is therefore an object of this invention to provide improved air-drying polyurethane compositions. It is another object of this invention to provide water-reducible air-drying polyurethanes having improved hydrolytic stability.

A more limited object of this invention relates to substrates coated with a multi-layer decorative and/or protective coating which comprises:

(i) a basecoat comprising pigmented film-forming polymer; and (ii) a transparent clearcoat comprising a film-forming polymer;

wherein the basecoat and/or the clearcoat comprises the water-reducible air-drying polyurethane of this invention. These and other objects of this invention will be apparent from the following description.

DETAILED DESCRIPTION OF THE INVENTION

The reaction of the fatty amide diol, the diisocyanate and the acid-functional compound and any optional material to produce the water-reducible polymers of this invention can be conveniently accomplished by admixing, typically in the presence of an inert solvent such as esters, ethers or ketones, all of the reactants and maintaining the reaction conditions until the desired extent of reaction has been completed. Typically, the reaction is conducted at temperatures ranging from about 25° C. to about 120° C., and especially around 50° C. to 90° C., although somewhat higher or lower reaction temperatures can also be useful depending on the reactivity of the individual components. Temperatures of about 90° C. or less are preferred because there is essentially no reaction of the acid functionality of the preferred dihydroxy carboxylic acids with the isocyanate at those temperatures. It is preferred to conduct the reaction in the presence of a catalytic amount of a catalyst for the isocyanate reaction, such as tertiary amines or tin compounds such as dibutyl tin dilaurate. In one convenient method for preparing the polyurethanes of this invention, the fatty amide diol, the acid-functional compound and any optional active hydrogen-containing materials are heated to the desired reaction temperature in the presence of an inert solvent and the isocyanate-containing reactant is gradually added to the heated mixture over a period of several hours. If desired, the reaction can be quenched by the addition of methanol or other material which will react with any remaining isocyanate groups.

As mentioned, if desired, the polyurethane polymers can be chain extended as is well known in the art by the addition of other diols or diamines along with the fatty amide diol, the acid-functional compound and the diisocyanate. Typical chain extending diols include low molecular weight diols such as ethylene glycol, 1,4-cyclohexanedimethanol, 1,4-butane diol, 1,5-pentane diol, 1,6-hexane diol, 1,10-decane diol, polyether diols such as dipropylene glycol, tetrapropylene glycol, diethylene glycol and tetraethylene glycol, and the polycaprolactone diols. Higher molecular weight diols such as poly(tetramethylene ether)glycol and homopolymers and copolymers of poly(ethylene oxide) and poly(propylene oxide) are also useful. Typical chain extending diamines include ethylenediamine, 1,3-diaminopropane, 1,4-diaminobutane, 1,6 diaminohexane, para-phenylenediamine, isophorone diamine, 2-methylpentamethylenediamine, and 4,4'-methylene-bis-(o-chloroaniline).

Optionally, very small amounts, e.g. less than about five percent by weight, preferably less than three percent by weight, of all the reactants, of polyfunctional materials having more than two active hydrogens or more than two isocyanate groups can also be included in the reaction mixture. Representative polyfunctional materials include polycaprolactone triols, trimethylol propane, triethanol amine, tetraethylenetriamine, diethylenetriamine or tri-functional isocyanates such as the tri-functional biuret of hexamethylene diisocyanate sold by Mobay Company as Desmodur ® N.100. If polyfunctional materials are utilized, care must be exercised to prevent gelation of the reaction mixture by techniques such as careful selection of the equivalent ratios, order of addition, and use of quenchants such as methanol.

The fatty amide diol, the acid-functional compound and, optionally, the chain extending diol or diamine and/or the active hydrogen containing polyfunctional material can be utilized in any proportion relative to each other with the proviso that it is preferable to have the acid-functional compound present in an amount to provide an acid value of at least 25, and preferably at least 40, in the final polyurethane polymer to allow for water dispersibility upon neutralization. It is also preferred that the polyurethane be free of any unreacted isocyanate. Therefore, for each equivalent of isocyanate there should be 1.0 to about 1.4 total equivalents of active hydrogen available from the fatty amide diol and the acid-functional compound and, if utilized, the polyfunctional compound and/or the chain extending diol or diamine. Typically, depending on the molecular weight of the raw materials and the performance characteristics desired, the acid-functional compound will comprise about 5 to 40 percent by weight of the reactants, the fatty amide diol will comprise about 10 to about 50 percent by weight, and the diisocyanate will comprise about 30 percent to about 70 percent. The optional diol or diamine chain extenders can be present at from 0 to about 30 percent by weight. The optional polyfunctional compounds can be present in the reaction mixture from 0 to about 5 percent by weight.

The fatty amide diols of unsaturated fatty acids utilized in the preparation of the polyurethanes of this invention are conveniently obtained by the reaction of N,N-dialkanol amines with fatty acids or fatty acid derivatives, such as the fatty acid esters or fatty acid chlorides. The term "fatty acid derivative" means those derivatives of a fatty acid where the —OH group of the carboxylic acid has been replaced by —Cl or —OR, where R is 1 to about 4 carbons, and where the fatty acid derivative is reactive with an amine to produce an amide. The N,N-dialkanol amine and the fatty acid or fatty acid derivative are reacted at an equivalent ratio of essentially 1:1. Representative N,N-dialkylolamines include, for example, N,N-diethanol amine, N,N-diisopropanol amine, N,N-dibutanol amine, and N,N-dicyclohexylethanol amine. The fatty acids are obtained from drying and/or semi-drying oils, such as linseed oil, soybean oil, tall oil, dehydrated castor oil, tung oil, and fish oil. Amide diols prepared by the reaction of fatty acids or fatty acid derivatives and N,N-dialkylolamines are commercially available from Henkel under the trade mark Comperlan.

The reaction between the fatty acid or fatty acid derivative and the N,N-dialkanol amine may be conducted in the presence of an appropriate catalyst such as an alkali metal or alkali metal oxide. Typically, the fatty acids or fatty acid esters (usually the methyl ester or ethyl ester) are reacted with the amino group of the N,N-dialkanol amine in an inert solvent at temperatures ranging from about 80° C. to about 200° C. Useful fatty acid esters are conveniently prepared by reaction of the fatty acid or the triglyceride of the fatty acid with low molecular weight alcohols having one to about four carbon atoms.

Due to their reactivity, it is frequently preferred to utilize the fatty acid esters, and especially preferred to utilize the acid chlorides of the fatty acids for the reaction with the amino groups of the N,N-dialkanol amines. The acid chlorides are conveniently prepared from the fatty acids by techniques well-known in the art, such as reaction with thionyl chloride, phosphorous trichloride, phosphorous pentachloride, oxalyl chloride, etc. The preparation of the acid chloride typically is obtained by reacting essentially chemically equivalent amounts of the fatty acid and the appropriate chloride in the presence of an inert solvent at reflux temperatures until the preparation of the acid chloride is complete. When the acid chloride is subsequently reacted with the N,N-dialkanol amine, a tertiary amine such as triethylamine will typically be added to scavenge the acid liberated by the reaction. The acid chloride and the N,N-dialkanol amine are typically reacted in the presence of an inert solvent at essentially a 1:1 equivalent ratio at temperatures ranging from about 5° C. to about 60° C. to produce the fatty acid amide. Alternatively, the reaction of the fatty acid chloride and the N,N-dialkanolamine can be performed in the presence of a base such as pyridine or sodium hydroxide (Schotten-Baumann reaction conditions).

The diisocyanates which are suitable in the preparation of the polyurethanes of this invention are well known in the art. Representative diisocyanates include the aliphatic diisocyanates such as trimethylene, tetramethylene, pentamethylene, hexamethylene, trimethylhexamethylene, 1,2-propylene, 1,2-butylene, 2,3-butylene, 1,3-butylene, ethylidine and butylidene diisocyanates; the cycloalkylene diisoayantes such as 3-isocyanotomethyl-3,5,5-trimethylcyclohexylisocyanate, and the 1,3-cyclopentane, 1,4-cyclohexane, and 1,2-cyclohexane diisocyanates; the aromatic diisocyanates such as m-phenylene, p phenylene, 4,4'-diphenyl, 1,5-naphthalene and 1,4-naphthalene diisocyanates; the aliphatic-aromatic diisocyanates such as 4,4'-diphenylene methane, 2,4- or 2,6-toluene, or mixtures thereof, 4,4'-toluidine, and 1,4-xylylene diisocyanates; the nuclear substituted aromatic diisocyanates such as dianisidine diisocyanate, 4,4'-diphenylether diisocyanate and chloro-diphenylene diisocyanate. Prepolymers having two isocyanate groups per molecule, such as those obtained by the reaction of an excess of diisocyanate with active hydrogen-containing compounds such as diols, diamines, etc. are also convenient for the preparation of suitable diisocyanate reactants.

The acid-functional compounds useful in the practice of this invention have at least one acid group, such as a carboxylic acid or sulfonic acid group, and two active hydrogen groups, other than carboxylic acid groups, which are capable of reacting with the diisocyanate. Active hydrogen functionality means those reactive groups as determined by the Zerewitinoff Method as described by Kohler in J. Am. Chem. Soc. 49-3181 (1927). Representative reactive groups include —OH, —SH, —NH, etc. Especially preferred groups for reaction with the isocyanate groups are primary and secondary hydroxyl groups and primary and secondary amino groups. Since the diisocyanates react preferentially with the hydroxyl groups or amino groups, rather than reacting with the sulfonic or carboxylic acid groups, the acid-functional compound can be reacted with the diisocyanate and the acid functionality remains intact to provide the acid-functional polyurethane. Optionally, it is sometimes preferred to neutralize the sulfonic or carboxylic acid groups with a tertiary amine prior to reaction with the isocyanates in order to completely minimize any possible reaction of the acid group with the isocyanate groups.

Examples of acid-functional compounds having at least one carboxylic acid group and having two hydroxy groups include 1,2-dihydroxypropionic acid, 2,3-dihydroxypropionic acid, 2,5-dihydroxypentanoic acid, 2,3-dihydroxysuccinic acid and 8,9-dihydroxystearic acid.

Examples of acid-functional compounds having at least one acid group and two amino groups include α,β-diaminovaleric acid, lysine, α,β-diaminopropionic acid, 2,3-diamino-propane sulfonic acid, and the like.

Especially preferred in the practice of the invention are dihydroxy carboxylic acid compounds having the formula:

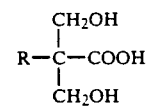

wherein R is hydrogen or alkyl of 1 to 20 carbons. Representative acids include 2,2-di(hydroxymethyl)acetic acid, 2,2-di(hydroxymethyl)propionic acid, 2,2-di(hydroxymethyl)pentanoic acid, 2,2-di(hydroxymethyl)valeric acid, etc. Especially preferred as the acid-functional compound is 2,2-di(hydroxymethyl)propionic acid.

Acid-functional compounds having at least one sulfonic acid group and two hydroxyl groups include 1,2-dihydroxy-propane-3-sulfonic acid, 2,3-dihydroxy-propane-sulfonic acid, 1,4-dihydroxy-butane-2-sulfonic acid, etc.

The coatings of this invention can be utilized as clearcoatings or optionally may contain extender and/or opacifying pigments as is well known in the art. Representative extender pigments include calcium carbonate, clays (aluminum silicates), talc, magnesium silicate, silicas, calcium silicate, micas (potassium aluminum silicate), barytes, gypsum (calcium sulfate), diatomaceous earth, etc. Representative opacifying pigments include titanium dioxide, zinc oxide, antimony oxide, organic or inorganic chromatic pigments, such as iron oxide, carbon black, zinc chromate, phthalocyanine blue, etc., as well as metallic pigments such as aluminum, etc.

The coatings may also contain other additives such as flow agents, catalysts or metallic driers such as cobalt, manganese, lead, zinc, rare earth metals, etc., diluents, which may be reactive, ultraviolet light absorbers, etc.

Optionally, the coatings could also include crosslinkers such as polyepoxides, which are reactive with the acid groups of the polyurethane, or, if the polyurethane is formulated with excess hydroxyl groups remaining, the crosslinkers could include melamine, urea or isocyanate types of crosslinkers. The coatings may typically be applied to any substrate, such as metal, plastic, wood, glass, synthetic fibers, etc. by brushing, dipping, roll coating, flow coating, spraying, electrodeposition, or other method conveniently employed in the coating industry. Normally, the coatings of this invention are cured at room temperature, but bake temperatures up to about 250° C. can be utilized to force dry or crosslink the coatings.

One preferred use of the air-drying polyurethanes of this invention relates to their use as clearcoats and/or basecoats in clearcoat/basecoat formulations.

Clearcoat/basecoat systems are well known, especially in the automobile industry where it is especially useful to apply a pigmented basecoat, which may contain metallic pigments, to a substrate and allow it to form a polymer film followed by the application of a clearcoat which will not mix with or have any appreciable solvent attack upon the previously applied basecoat. The basecoat composition may be any of the polymers known to be useful in coating compositions including the air-drying polyurethane compositions of this invention. The water-reducible polyurethane of this invention can be utilized in combination with either solvent based or water-missible basecoats and clearcoats.

One useful polymer basecoat includes the acrylic addition polymers, particularly polymers or copolymers of one or more alkyl esters of acrylic acid or methacrylic acid, optionally together with one or more other ethylenically unsaturated monomers. These polymers may be of either the thermoplastic type or the thermosetting, crosslinking type which contain hydroxyl or amine or other reactive functionality which can be crosslinked. Suitable acrylic monomers for either type of polymer include methyl methacrylate, ethyl methacrylate, propyl methacrylate, butyl methacrylate, ethyl acrylate, butyl acrylate, acrylonitrile, acrylamide, etc. Other ethylenically unsaturated monomers which can be copolymerized with the acrylic monomers include styrene, vinyl acetate and vinyl chloride. Where the polymers are required to be of the crosslinking type, suitable functional monomers which can be used in addition to those already mentioned include acrylic or methacrylic acid, hydroxy ethyl acrylate, 2-hydroxy propyl methacrylate, glycidyl acrylate, tertiary-butyl amino ethyl methacrylate, etc. The basecoat composition may, in such a case, also contain a crosslinking agent such as a polyisocyanate a polyepoxide, or a nitrogen resin such as a condensate of an aldehyde such as formaldehyde with a nitrogeneous compound such as urea, melamine or benzoguanamine or a lower alkyl ether of such a condensate.

Other polymers useful in the basecoat composition include vinyl copolymers such as copolymers of vinyl esters of inorganic or organic acids, such as vinyl chloride, vinyl acetate, vinyl propionate, etc., which copolymers may optionally be partially hydrolyzed so as to introduce vinyl alcohol units.

Other polymers useful in the manufacture of the basecoat include alkyd resins or polyesters which can be prepared in a known manner by the condensation of polyhydric alcohols and poly carboxylic acids, with or without the inclusion of natural drying oil fatty acids. The polyesters or alkyds may contain a proportion of free hydroxyl and/or carboxyl groups which are available for reaction, if desired with suitable crosslinking agents as discussed above.

If desired, the basecoat composition may also contain minor amounts of a cellulose ester, to alter the drying or viscosity characteristics of the basecoat.

Typically, the basecoat will include pigments conventionally used for coating compositions and after being applied to a substrate, which may or may not previously have been primed, the basecoat will be allowed sufficient time to form a polymer film which will not be lifted during the application of the clearcoat. The clearcoat is then applied to the surface of the basecoat, and the system can be allowed to dry or, if desired, can be force dried by baking the coated substrate at temperatures typically ranging up to about 250° F.

Typically, the clearcoat may contain ultraviolet light absorbers such as hindered phenols or hindered amines at a level ranging up to about 6% by weight of the vehicle solids as is well known in the art. The clearcoat composition may comprise any of the polymers known to be useful in coating compositions including the air-drying polyurethanes of this invention. The clearcoat can be applied by any application method known in the art, but preferably will be spray applied. If desired, multiple layers of basecoat and/or clearcoat can be applied. Typically, both the basecoat and the clearcoat will each be applied to give a dry film thickness of about 0.01 to about 6.0, and especially about 0.5 to about 3.0 mils.

The following examples are intended to illustrate the invention but are not presented as limitations upon the scope of the claims.

EXAMPLE I

Preparation of Fatty Acid Chloride.

A reaction vessel equipped with a stirrer, nitrogen inlet and reflux condenser was charged with 280 grams linseed fatty acid, and 400 milliliters of methylene chloride. While stirring the reaction mixture, 130 milliliters of oxalyl chloride was added drop-wise to the reaction mixture over approximately a 3 hour period. The reaction mixture was then heated to reflux and maintained at reflux temperatures for approximately 2 hours at which time the volatiles were removed by vacuum distillation to yield approximately 296 grams of the acid chloride product.

EXAMPLE II

Preparation of Fatty Acid Amide.

A reaction vessel equipped with a stirrer, condenser, nitrogen inlet and thermometer was charged with 200 grams of chloroform and 105 grams of diethanol amine and the reaction vessel was cooled with stirring to approximately 10° C. Simultaneous addition of 296 grams of linseed fatty acid chloride, as prepared in Example I, and 101 grams of triethylamine was completed over approximately 3 hours while the reaction vessel was maintained at 10° C. The reaction mixture was then left stirring at room temperature for 20 hours. The precipitated material (salt of triethylamine) was filtered, the organic extract was washed with water, dilute hydrochloric acid (twice), water, dilute sodium bicarbonate solution, saturated sodium chloride solution and finally dried over magnesium sulfate. After filtration of the magnesium sulfate, the volatiles were removed under reduced pressure to obtain approximately 200 grams of the linseed fatty acid diethanolamide product.

Examples III, IV and V show the preparation of water-reducible polyurethane products incorporating the fatty acid amide materials. The polyurethanes were prepared at 60% by weight of reactants in methyl ethyl ketone (MEK) solvent or mixtures of MEK and N-methyl-2-pyrrolidinone (NMP). The polymers were prepared in a reaction vessel as described in Example I according to the following general procedure.

The linseed fatty acid amide of Example II and 2,2-di(hydroxymethyl)propionic acid (DMPA) were added to the reaction vessel and heated to obtain a homogeneous mixture. NMP, MEK (a part of the total amount) and catalyst (dibutyl tin dilaurate, T-12, M&T Chemicals) were added at this time and the mixture heated to 75° C. to 80° C. The amount of catalyst used was 0.02% based on monomer weight. The solution of diisocyanate and MEK (remaining amount) was then added over 2 to 3 hours with stirring. After the completion of the isocyanate addition, the reaction mixture was held at 75° C. to 80° C. until the desired extent of reaction was attained. The progress of the reaction was followed by infrared spectroscopy (the decrease in isocyanate peak intensity). The reaction was quenched by the addition of excess methanol and a sample saved for determination of the characteristics of the polyurethane. To obtain an aqueous dispersion of the polyurethane, the required amount of ammonia or triethylamine (TEA) or a mixture of the two amines was added to the solution of polyurethane. Deionized water and, if desired, more co-solvent (NMP or ethylene glycol monobutyl ether) was then added and a part of the volatiles were removed under reduced pressure to obtain the aqueous dispersion of polyurethane at the required weight solids.

EXAMPLE III

This polyurethane was prepared from 200 grams of the linseed fatty acid diethanolamine adduct of Example II, 263 grams of Desmodur ® W (trademark of the Mobay Company for 4,4,'-methylene-bis(cyclohexylisocyanate)) and 66 grams of 2,2-di(hydroxymethyl)-propionic acid (DMPA) and 352 grams of methyl ethyl ketone. The reaction mixture was held at approximately 75° C. to 80° C. for 6 hours. Methanol (20 grams) was then added to react with any remaining isocyanate groups. 117 grams of ethylene glycol monobutyl ether, 76 grams of triethylamine and 275 grams of deionized water were added and a homogeneous dispersion was obtained. A part of the volatiles were removed by vacuum distillation to obtain a 56% NVM (non volatile material by weight) solution having an acid value (on solids) of 55, a molecular weight (GPC) of 2,600 (number average molecular weight) and a polydispersity of 1.9. This polymer represents a mole ratio of amide/acid/isocyanate of 1.1/1/2 and a weight ratio of 38/12/50.

EXAMPLE IV

Following the same procedure as in Example III, 260 grams of the linseed fatty acid/diethanolamine adduct of Example II, 86 grams of 2,2-di(hydroxymethyl)propionic acid and 341 grams of Desmodur ® W in 458 grams of methyl ethyl ketone was reacted at approximately 75° C. to 80° C. for 9 hours followed by the addition of 20 grams of methanol to quench the reaction. 32 grams of triethylamine, 19 grams of ammonium hydroxide and 533 grams of deionized water were mixed with the product to obtain a homogeneous dispersion. A part of the volatiles were removed by vacuum distillation and 314 grams of ethylene glycol monobutyl ether and 292 grams of deionized water were added to obtain a 55% NVM aqueous dispersion of the polyurethane having an acid value (on solids) of 63, a number average molecular weight (GPC) of 3,500 and a polydispersity of 2.6. This polymer represents a mole ratio of amide/acid/isocyanate of 1.1/1/2 and a weight ratio of 38/12/50.

EXAMPLE V

Following the procedure of Example III, 260 grams of Comperlan F (linoleic acid diethanol amide commercially available from Henkel), 95 grams of 2,2-di(hydroxymethyl)propionic acid and 374 grams of Desmodur ® W in a solvent mixture containing 304 grams of methyl ethyl ketone and 182 grams of N-methyl-2-pyrrolidinone were added to the reaction vessel. The reaction mixture was held at 75° C. to 80° C. for 4 hours and then 20 grams of methanol was added to quench the reaction. An additional 106 grams of N-methylpyrrolidinone was added and some of the volatiles were removed under reduced pressure. The polyurethane was then neutralized with a 1-to-1 mixture of ammonia/triethylamine and was dispersed in water to obtain a 66% NVM aqueous solution. The water-reducible fatty acid amide substituted polyurethane had an acid value (on solids) of 49, a number average molecular weight (GPC) of 3,300 and a polydispersity of 2.9. This polymer represents a mole ratio of amide/acid/isocyanate of 1/1/2 and a weight ratio of 36/13/51.

Clear coatings were obtained by adding cobalt drier (0.01 weight percent based on solids) to the aqueous dispersions of the fatty acid amide substituted polyurethanes prepared in Examples III, IV and V and the resulting dispersions were drawn down over iron phosphate treated steel panels to obtain dry film thicknesses of approximately 1–1.5 mils. The properties of the clear coatings obtained from these water-reducible polyurethanes are described in the table below:

TABLE 1

| Properties of Clear coatings from W/R Polyurethanes | | | |
|---|---|---|---|
| | Example Number | | |
| Property Tested | III | IV | V |
| Dry-time, min. | | | |
| Dry-to-touch | 90 | 12 | 146 |
| Tack-free | 110 | 20 | 186 |
| Konig Pendulum Hardness | | | |
| 1 day | 10 | 83 | 112 |
| 7 day | 31 | — | 131 |
| Pencil Hardness | | | |
| 1 day | <6B | 3B | HB |
| 7 day | <6B | — | HB |
| Isopropanol Resistance | | | |
| 1 day (double rubs | 24 | 46 | 58 |
| 7 day to failure) | 40 | — | >100 |

THE INVENTION CLAIMED IS:

1. An air-drying, water-reducible, acid-functional polyurethane which comprises the reaction product obtained by reacting:
   (i) a fatty amide diol obtained by the reaction of a fatty acid or fatty acid derivative and an N,N-dialkanol amine; and
   (ii) a diisocyanate; and (iii) an acid-functional compound which also has two active hydrogen groups, other than acid groups, which are reactive with the diisocyanate.

2. The polyurethane of claim 1 wherein the fatty acid derivative is a fatty acid chloride.

3. The polyurethane of claim 1 wherein the active hydrogen groups on the acid-functional compound are hydroxyl groups.

4. The polyurethane of claim 3 wherein the acid-functional compound has the formula:

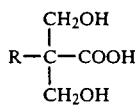

wherein R is hydrogen or alkyl of 1 to 20 carbons.

5. The polyurethane of claim 4 wherein R is alkyl of 1 to 8 carbons.

6. The polyurethane of claim 4 wherein the acid-functional compound is selected from the group consisting of 2,2-di(hydroxymethyl)acetic acid, 2,2-di(hydroxymethyl)propionic acid, 2,2-di(hydroxymethyl)pentanoic acid and 2,2-di(hydroxymethyl)valeric acid.

7. The polyurethane of claim 1 wherein the active hydrogen groups on the acid-functional compound are amine groups.

8. The polyurethane of claim 1 wherein the dialkanol amine is N,N-diethanol amine.

9. The polyurethane of claim 1 further characterized in that it has an acid value of at least 25.

10. The polyurethane of claim 1 further characterized in that it has an acid value of at least 40.

11. The polyurethane of claim 1 further characterized in that it has an acid value ranging from about 25 to about 150.

12. The polyurethane of claim 1 further characterized in that it has an acid value of 40 to about 100.

13. The polyurethane of claim 1 further characterized in that it also incorporates a metallic drier.

14. The polyurethane of claim 1 further characterized in that the acid-functional compound is 2,2-di(hydroxymethyl)propionic acid.

15. The polyurethane of claim 1 further characterized in that the polyurethane is chain extended by the addition of a diol or a diamine.

16. The polyurethane of claim 1 wherein the ratio of equivalents of isocyanate to the total equivalents of active hydrogen available from the hydroxyl groups of the fatty amide diol and the active hydrogen groups of the acid-functional compound is from 1/1 to about 1/1.4.

17. The polyurethane of claim 1 wherein the polyurethane also incorporates a polyfunctional compound.

18. An air-drying, water-reducible, acid-functional polyurethane which comprises the reaction product obtained by reacting a mixture of reactants which comprises in percent by weight:
(i) 10 to 50% of a fatty amide diol obtained by the reaction of a fatty acid or fatty acid derivative and an N,N-dialkanol amine; and
(ii) 30–70% of a diisocyanate; and
(iii) 5–40% of an acid-functional compound which also has two active hydrogen groups, other than acid groups, which are reactive with the diisocyanate; and
(iv) 0–30% of a diol or diamine chain extender; and
(v) 0–5% of a polyfunctional material having more than two active hydrogens or more than two isocyanate groups per molecule.

19. An aqueous coating composition which comprises an aqueous dispersion of a base-neutralized acid-functional air-drying polyurethane wherein the acid-functional air-drying polyurethane comprises the reaction product obtained by reacting:
(i) a fatty amide diol obtained by the reaction of a fatty acid or fatty acid derivative and an N,N-dialkanol amine; and
(ii) a diisocyanate; and
(iii) an acid-functional compound which also has two active hydrogen groups, other than acid groups, which are reactive with the diisocyanate.

20. The aqueous coating composition of claim 19 wherein the coating composition also incorporates a crosslinker for the acid-functional polyurethane.

* * * * *